United States Patent [19]

Squifflet, Sr.

[11] 4,187,047
[45] Feb. 5, 1980

[54] SYSTEM AND APPARATUS FOR ERECTING A PORTABLE SILO AND ELEVATOR STRUCTURE

[75] Inventor: Edmond C. Squifflet, Sr., Issaquah, Wash.

[73] Assignee: Boeing Construction Equipment Company, Seattle, Wash.

[21] Appl. No.: 884,931

[22] Filed: Mar. 9, 1978

[51] Int. Cl.² ............................................. B60P 1/00
[52] U.S. Cl. .................................. 414/332; 414/498
[58] Field of Search ................ 214/2, 17 R, 501, 512, 214/515; 366/1, 22; 52/122, 143; 266/1, 22; 414/332, 498, 919

[56] References Cited

U.S. PATENT DOCUMENTS 3,112,099  11/1963  Heise ....................................... 366/1
3,116,051  12/1963  Preeman ................................... 366/1

Primary Examiner—Robert G. Sheridan
Attorney, Agent, or Firm—Nicolaas DeVogel

[57] ABSTRACT

A silo and elevator structure disposed in a folded-up arrangement on a trailer bed. Specific ground supports are first installed between the silo legs and ground level, the supports are specifically designed to carry the silo and also the elevator loads during erection procedures and remain part of the final assembly. In addition, the erected silo, which serves as a crane structure for raising and elevating the elevator, stays mounted, via hinge plate mounting brackets, to the trailer structure. Removal of the mounting connection of the hinge plate mounting brackets from the erected silo is the last step of the installation procedure prior to the removal of the trailer from the silo and elevator assembly.

4 Claims, 9 Drawing Figures

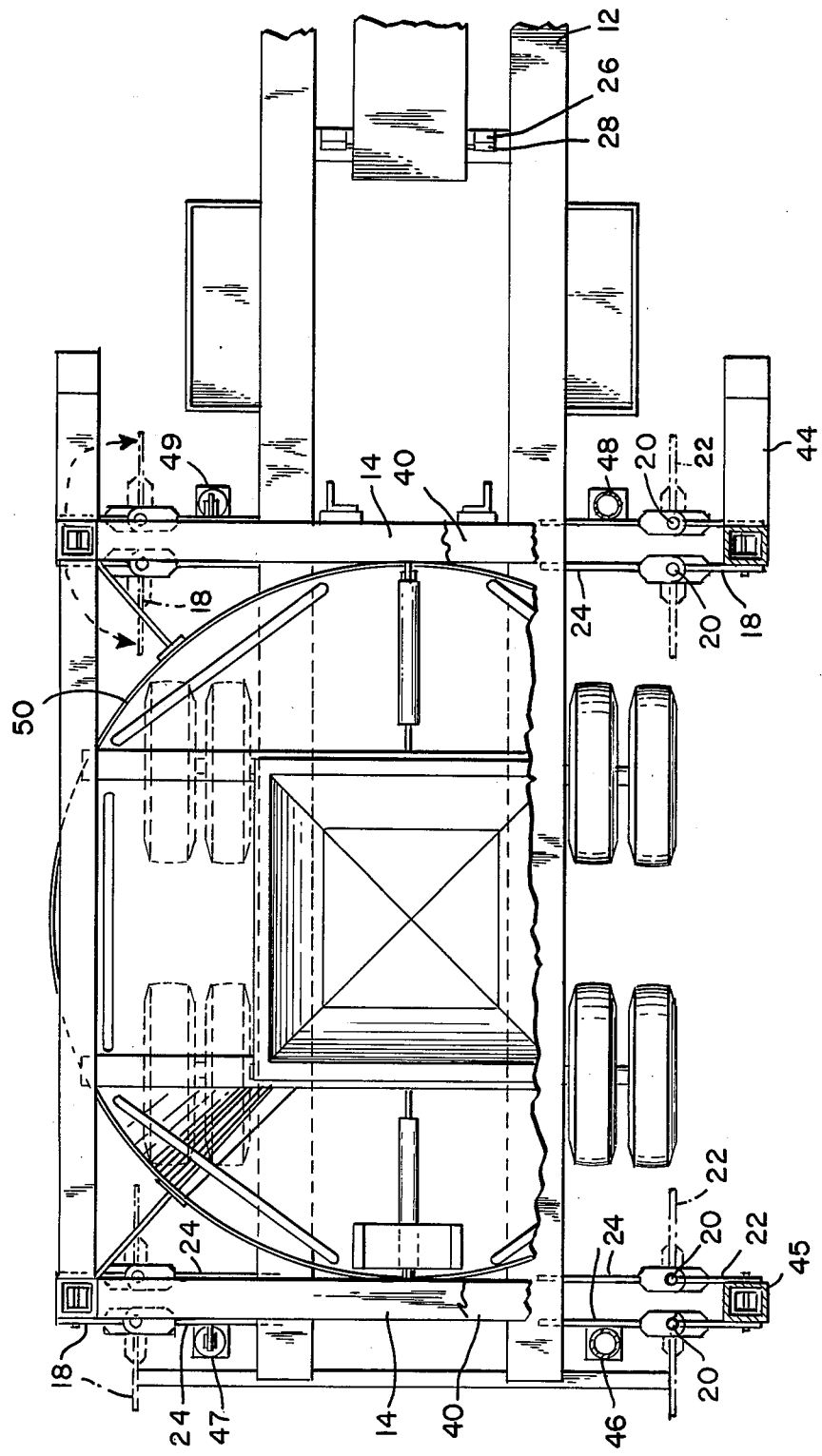

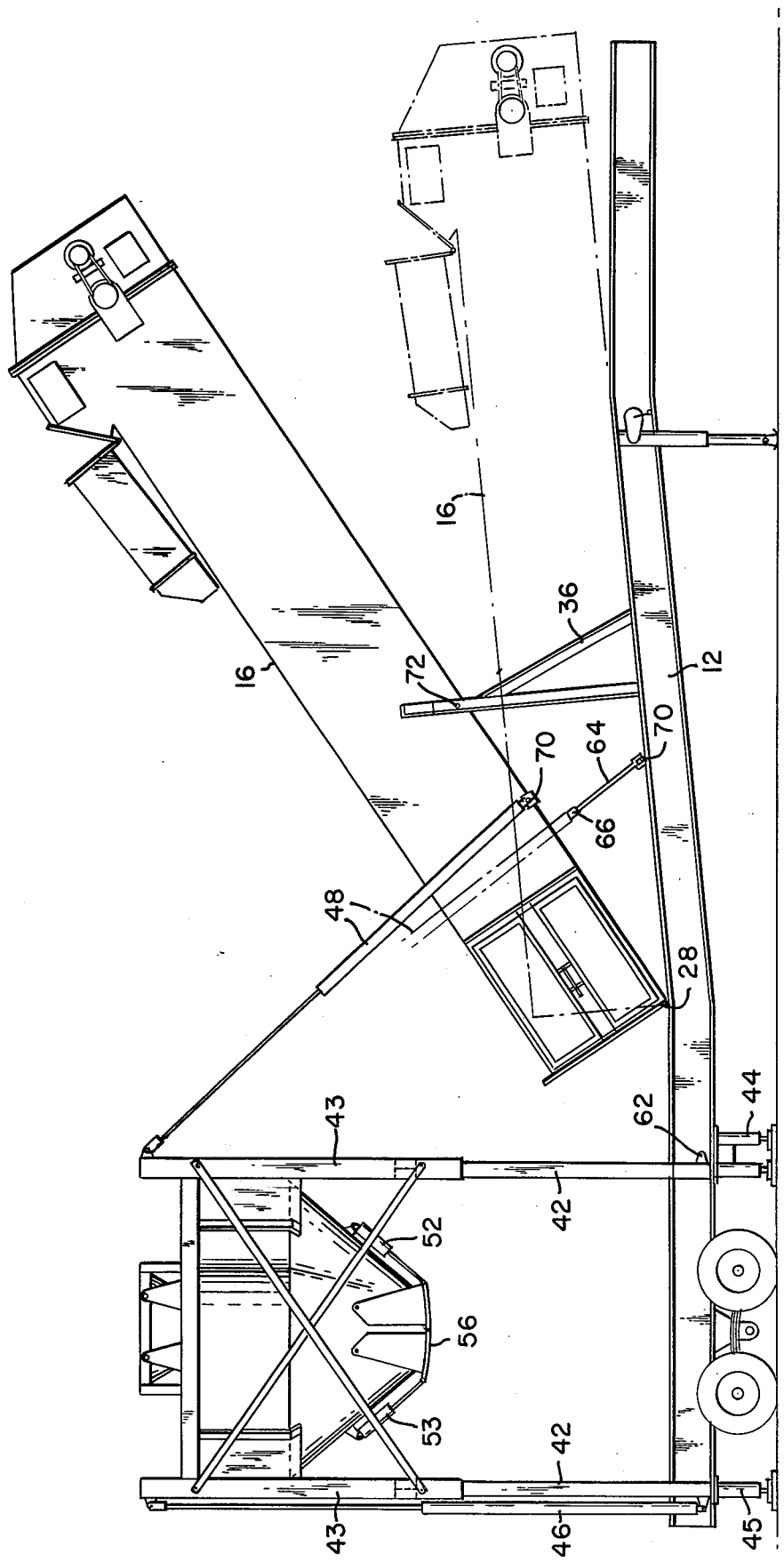

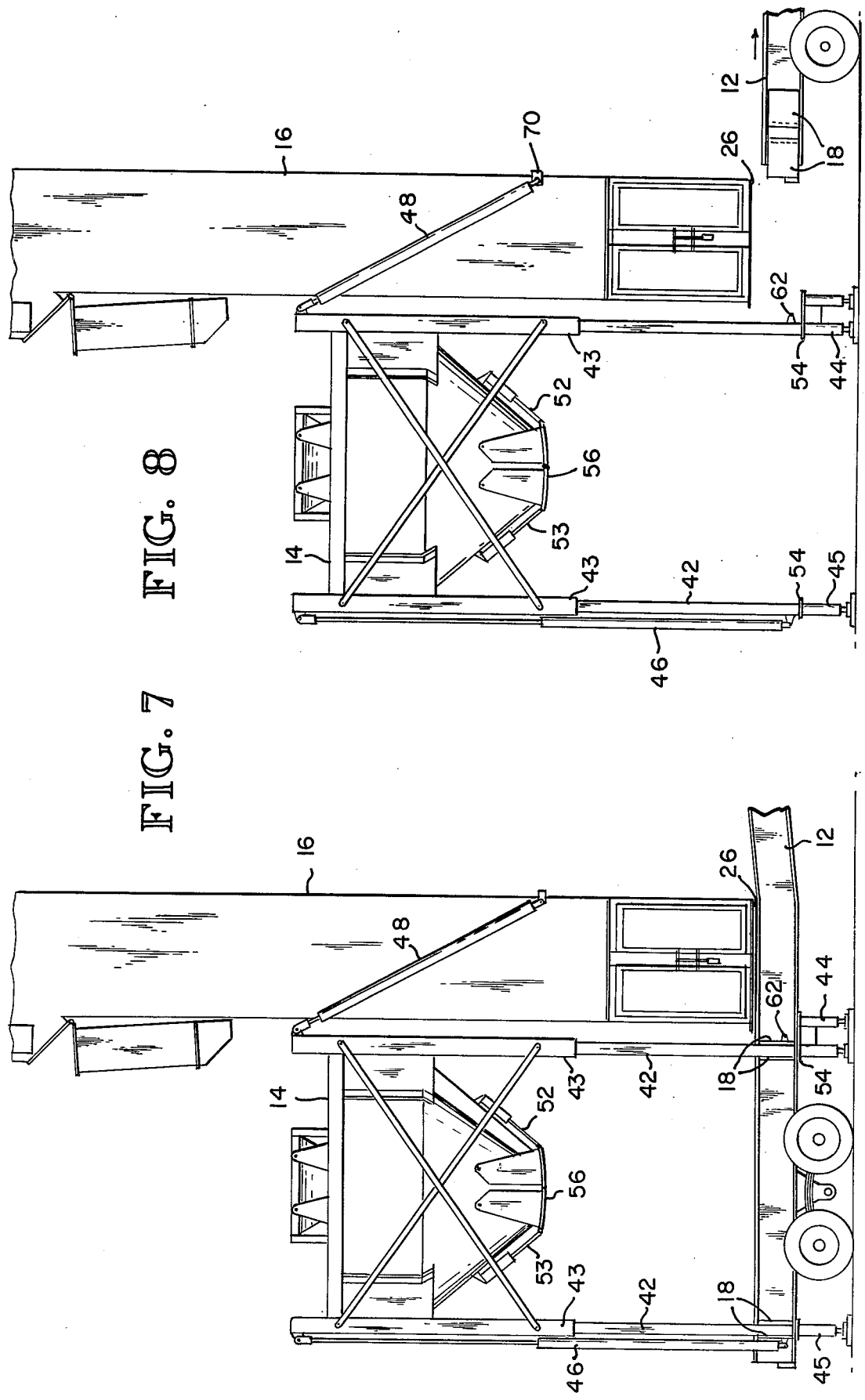

SYSTEM AND APPARATUS FOR ERECTING A PORTABLE SILO AND ELEVATOR STRUCTURE

BACKGROUND OF INVENTION (a) Field of the Invention

The present invention relates in general to a self-erecting portable plant and in particular to a system with components for erecting a silo and elevator designed specifically for asphalt mixing plants or the like.

(b) Description of the Prior Art

The present invention relates to a portable silo elevator combination designed for utilization with a plant which manufactures asphalt by the drum mixer process.

In the art of manufacturing asphalt there are two major processes, (1) the Pugmill Process, where sand and gravel is heated up prior to the mixing with the oil or asphalt material, (2) the Drum Mixer Process, where gravel, sand and asphalt is mixed and heated in a drum simultaneously.

There appears to be no portable asphalt plants using the drum mixer process in the prior art and accordingly, the only prior art material that is available, is the art which relates to portable asphalt plants using the Pugmill Process. In the Pugmill operation the mixing of the hot sand and gravel with the hot asphalt or oil is done within the Pugmill itself.

Accordingly, the following U.S. Patents described in a digested form, appear to be the closest prior art available from a thorough state-of-the-art and a novelty search.

In U.S. Pat. No. 2,112,326, the portable asphalt mixing plant requires two truck trailers, each towing a trailer towards the erection area. By means of a winch, hoisting cables and booms, an A-frame bracing structure is first erected, and thereafter, the elevator tower is erected which serves as a hoisting tower or crane for erecting and mounting the silo mixer plant into one portable asphalt mixing plant.

In U.S. Pat. No. 2,805,052, the mobile asphalt plant comprises a pugmill, dryer and elevator combination all arranged on one trailer unit. The manufacturing operation is of a low capacity in comparison to applicant's invention and relates to the manufacturing of a small batch of asphalt for a driveway or short private road operation. The plant erection procedure utilizes chains and sprockets for lifting the pugmill silo. Thus, the complete operation is a small scale structure and does not possess the problems of mobility and erection as is faced by large portable asphalt plant operations.

In U.S. Pat. No. 2,945,683, a similar type of portable mobile asphalt plant is disclosed, having a very small production, limited to about 500 lbs. of hot mix per hour. The whole contraption is cleverly foldably arranged on one trailer frame and serves a purpose for small commercial production. The configuration cannot be scaled up in size or capacity without exceeding highway height and width limitations.

In U.S. Pat. No. 3,116,051 another typical pugmill mobile mixing plant is disclosed. The main features of this patent relate to the telescoping silo mixer and screening units which are erected by means of chains and electric motors. The transportation requires at least a truck and a trailer and the trailer unit becomes part of the plant.

In U.S. Pat. No. 3,142,390, another portable self-erecting plant is disclosed which is somewhat similar to the previous one disclosed in U.S. Pat. No. 3,116,051 and which is capable also of a larger production of asphalt. However, the increase in size and capability discloses that various transportation means are needed such as two truck tractors for towing while the silo and bucket elevator are transported on separate trailers. The erection of the silo is accomplished by means of chains and electric motors. One of the main features is the telescoping unfolding of the silo which contains the storage bin, grating, screening and mixing units.

Generally speaking, the present invention in its preferred embodiment relates to part of a portable asphalt plant. The erection procedures, however, are unique and different from any prior art portable asphalt plants that are in existence. The present operation relates to the drum mixer process and produces 175 tons of asphalt per hour in a remote area where large roads, highways or parking areas are to be built. This type of large asphalt operation is hardly possible with the previous mentioned prior art devices. The sizes of the units involved of the present concept would normally require cranes and other large building tools in order to build and erect a similar type of plant. However, applicant's concept provides for a self-erecting plant by means of the unique transferring of loads from a trailer bed to the ground surface involving hardware components and one power source only. The arrangement of the large structural units and the unique details for balancing via the load transferring components enables one to erect the large asphalt facility within two hours.

It is, therefore, an object of the present invention to provide for a portable, self-erecting silo and bucket elevator unit for an asphalt plant which utilizes one hydraulic power source and activator arrangement for erecting the silo and bucket elevator.

It is another object of the present invention to provide for a portable, self-erecting silo and bucket elevator unit which requires one mode of transportation and is provided with load transferring means for erecting the silo structure and the elevator structure from its trailer bed surface onto a ground surface into final installation.

The most important object of the present invention is to provide for a portable, self-erecting silo and bucket elevator unit for an asphalt plant utilizing the drum-mixer asphalt manufacturing process for producing a high production output and wherein the large structural elements are erected from a trailer by an erection procedure of elevating loads by a one power source and activator means through a series of pre-determined steps thereby transferring loads via specific load transferring means to the ground and via the trailer structure and whereby upon final installation the trailer structure is demounted and removed.

Other objects and features of the invention will become apparent to those skilled in the art as the disclosure is made in the following detailed description of a preferred embodiment of the invention, as illustrated in the accompanying drawings.

SUMMARY OF THE INVENTION

In general, the present invention comprises a method and an apparatus for erecting a portable silo and elevator structure at a remote location for an asphalt production plant or the like. The portable silo and elevator structure are mounted on a tractortrailer unit. The silo structure is folded up in a telescoping arrangement at the rear of the trailer bed and mounted thereto by specific hinge mounting plates. The elevator is secured on the trailer bed between the silo and the tractor location and is also secured by a hinge plate structure.

When the portable unit arrives at the location for erection, the silo structure is mounted on ground support members. By means of hydraulic power and actuator cylinders, the silo is telescoped into a raised final position and secured by a bolting means. The elevator being secured by a pivot hinge means to the trailer bed is rotated about the hinge by the actuation of the same hydraulic power. Upon complete erection of the elevator, the elevator will be vertically positioned and parallel to the erected silo structure. By disconnecting the hinge pin of the pivot hinge means, the elevator will be disconnected from the trailer bed. Thereafter the silo structure, which was mounted to the trailer bed is disconnected therefrom so that the trailer bed can be removed. The elevator is thereafter lowered to the ground elevation and connected to the silo to form a compact elevator-silo structure for utilization.

It should be realized that the silo and elevator structures are of very large dimensions and weight and that the erection procedure incorporates various steps and that several pieces of hardware for transferring the loads in an orderly calculated manner are utilized in order to accomplish the complete structural assembly and installation.

The hardware utilized for the erecting procedure comprises silo-hinged mounting brackets, a pair of single and twin support legs, a pair of actuator extension arms, a restraint support and an elevator pivot hinge means. In summary, the erection of the silo is accomplished by four hydraulic actuators for extending the silo structure in a telescoping manner while the loads are carried via the hinge plate mounting brackets to the trailer bed and the support and twin support legs to the ground. In another step, for raising the elevator the loads are carried via the elevator pivot hinge mounted on the trailer bed structure to the twin support legs. The hinge plate mounting brackets, the actuator extension arm, the restraint support and the elevator pivot hinge are removed upon the disconnection of the trailer bed from the silo-elevator assembly upon completion of the installation.

In general, the present invention embodies a method of erecting a portable unexpanded silo and elevator structure which is secured by four pairs of hinge plate mounting brackets to a trailer bed, through the steps of (1) mounting the ground support legs to the silo, (2) telescoping the silo structure into an erected position, (3) pivoting the elevator on the trailer bed, about the pivot hinge, to an upright position next to the silo, (4) disconnecting the elevator from the trailer bed by removal of the pivot hinge pin, (5) disconnecting the hinge brackets from the silo legs, and (6) removing the trailer bed from the the now-erected silo and elevator.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

BRIEF DESCRIPTION OF THE DRAWINGS

FIG. 3 is a plan view of the silo structure arranged on the trailer bed with a partial section cut.

FIG. 6 is a side view of the elevator in the stored position and the silo in the erection process.

FIG. 7 is a side view of the silo and the erected elevator still mounted to the trailer bed structure.

FIG. 8 is a side view of the silo and elevator structure when the trailer is being removed.

DESCRIPTION OF THE INVENTION

Figure 2:
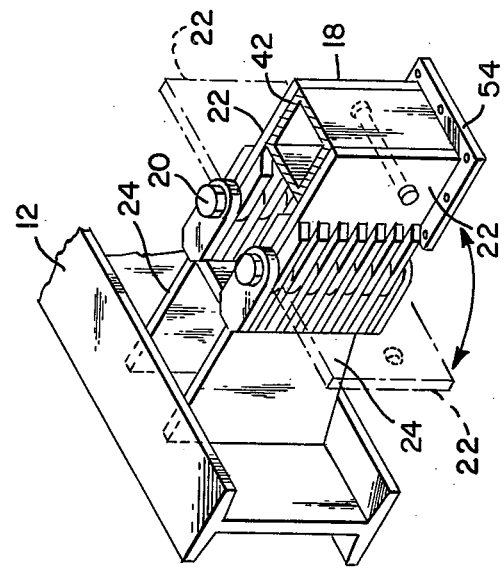
FIG. 2 is a perspective view of one pair of the hinge plate mounting brackets enclosed between the trailer frame and one silo leg.

Referring now to the drawings which illustrate the most preferred embodiment of the present invention and wherein like reference characters designate like or corresponding parts throughout the several views.

Figure 1:
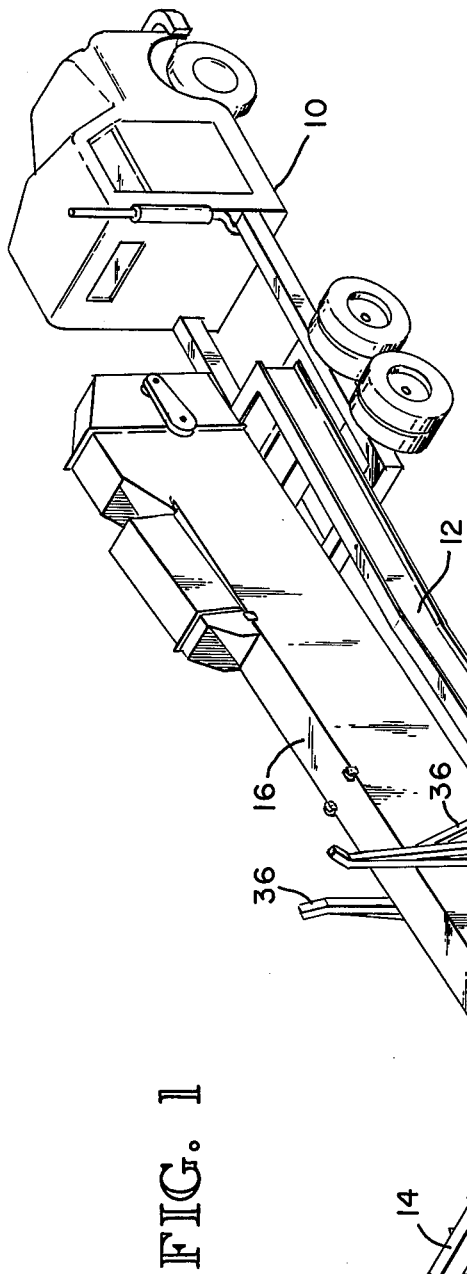
FIG. 1 is a perspective view of a folded up silo and elevator on a trailer in the transport mode.

There is shown in FIG. 1 a portable silo and elevator unit in its folded portable position. A trailer or tractor arrangement 10 is provided with a trailer 12, on which is secured an elevator 16 and an unexpanded silo 14. The elevator 16 is secured to the trailer bed 12, by restraining support members 36 and by an elevator pivot hinge 26. The silo structure 14 rests on its two horizontal beams 40 on the trailer bed 12 and is secured thereto by a plurality of hinge plate mounting means 18 welded to the side of the trailer bed 12. Each silo leg 42 is temporarily connected to a pair of the hinged plate mounted brackets 18.

The mounting details of each hinge plate mounting means or bracket 18 are illustrated in FIG. 2 wherein the silo leg 42 has on each side a hinged plate 22 which is bolted to the silo leg 42 and is further connected by the second hinge plate 24 welded onto the frame structure of the trailer bed 12. The first hinge plate 22 is pivotally connected to the second hinge plate 24 by a hinge bolt 20.

A plan view of the rear portion of the trailer bed 12 is illustrated in FIG. 3 and it shows the securement of the elevator 16 to the trailer bed 12 by the elevator pivot hinge means 26, which hinge is a conventional hinge structure having an elevator hinge pin 28. This plan view is taken when the first step of erecting the silo and elevator unit has been performed, because the single support legs 45 and the twin support legs 44 have been installed. The installation is accomplished by bolts or the like connecting the foot plates on the supports 44 and 45 to the foot plates 54 of the legs 42. As shown, the hinge plate mounting brackets 18 are integrally secured to the frame structure 12. However, the position of the disconnected hinge plate mounting means 18 is also illustrated in dot-dashed fashion, which is one of the last steps in erecting the silo and elevator unit. It should be noted that in the disconnected position, where the first hinge plates 22 are disconnected from the silo legs 42, the folded away first hinge plates 22 clear the trailer wheels and the silo legs 42 when the trailer 12 is removed from the raised silo elevator unit. In addition, the silo 14 is provided with four hydraulic actuator units 46-49. Furthermore, there is a funnel-type structure 50 with opening and closing actuators 52 and 53 for operating the clamshell door 56.

Figure 4:
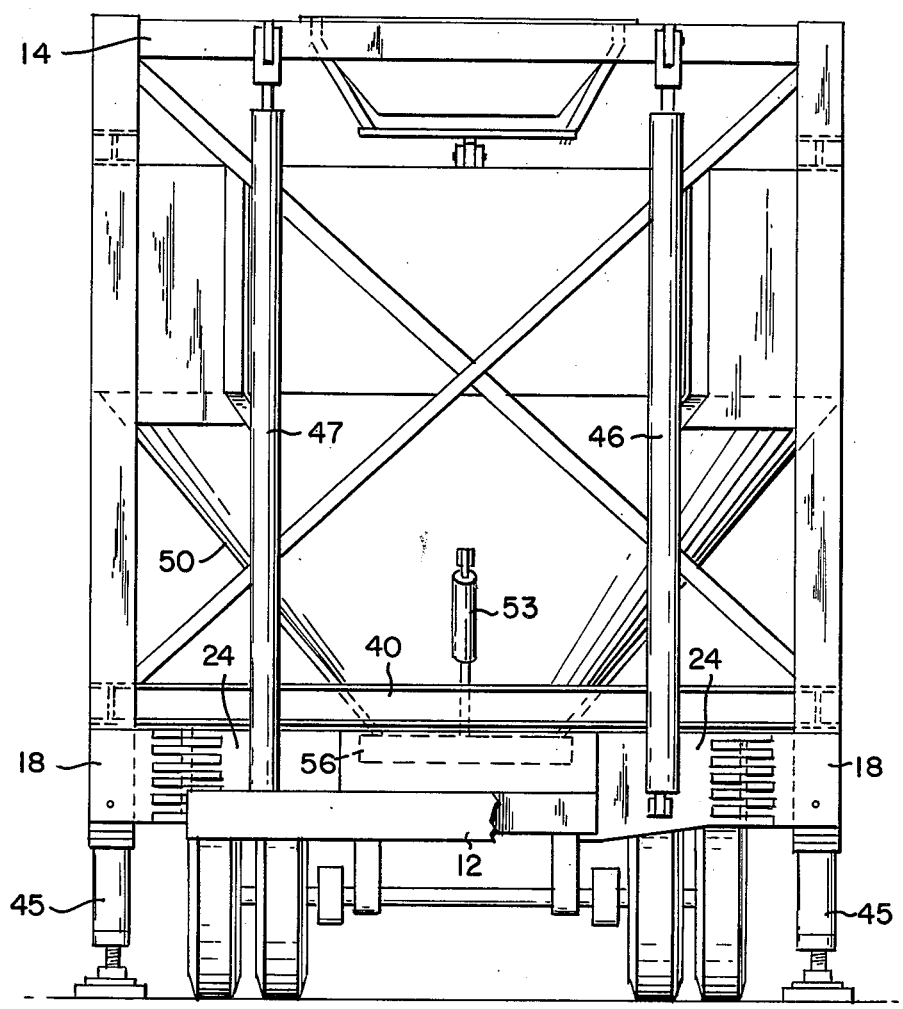
FIG. 4 is a rear view of the silo structure as arranged on the trailer bed.

Further details of this silo structure 14 are illustrated in FIG. 4, which is a rear view of the silo 14 when positioned on the trailer bed 12. Here again, the unique mounting of the silo 14 to the trailer bed 12 is illustrated by the hinge plate mounting means 18 in addition to the single support legs 45, which are utilized at the rear end of the silo 14 to accomplish the first erecting step of the silo-elevator unit.

The most important steps of the erection procedure for the silo-elevator unit are shown in the FIGS. 5 through 9 successively.

Figure 5:
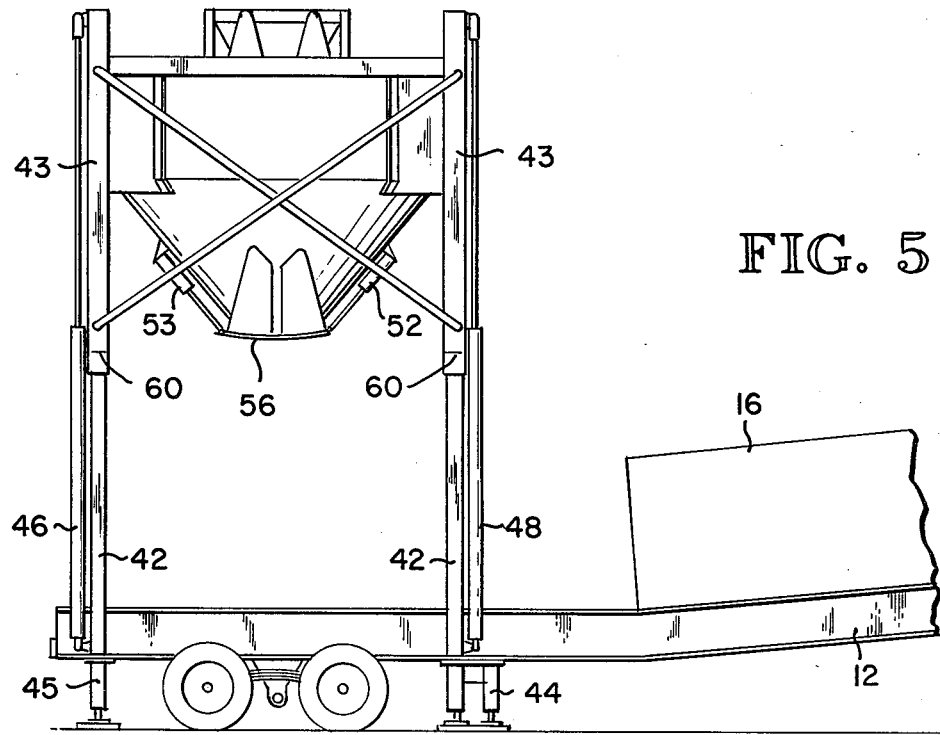
FIG. 5 is a side view of the silo in its erected position and still connected to the trailer bed.

Starting at FIG. 5, assuming a proper location has been found, which preferably is substantially level, the trailer tractor 10 will park its trailer bed 12 at that particular location. The first step comprises the mounting of a pair of single support legs 45 and a pair of twin support legs 44 underneath the elevator legs 42. As illustrated, the silo legs 42 are of a two part telescoping assembly so that not the complete silo can be raised to a predetermined height. This raising is accomplished by a hydraulic source, (not shown) which may be from the tractor unit engine itself or which hydraulic source is provided by an additional auxiliary source. Accordingly, actuator 46 through 49 will raise the silo to the proper position. As soon as this position is obtained, locking pins 60 are inserted through the legs 42 and 43 to keep the silo 14 in its extended or telescoped condition.

As illustrated in FIG. 6, the actuators 48 and 49 are now removed from their bottom connection 62 and an extension part 64 is connected to the end portion 66 of the actuators 48 and 49. When the extension arm or part 64 is connected to the elevator attachment point 70, the hydraulic power source is applied and the elevator is raised to the solid line position, as illustrated in FIG. 6.

It will be understood that the length, weight and distance of the elevator structure 60 in its stored position necessitates the use of the extension arm 64 in order to have the proper pivoting leverage to raise the elevator 16 to its first stage. The elevator 16 is thus raised about pivot pin 28 and a holding means 72, such as a beam, pins or the like is temporarily installed to keep the elevator in its first stage raised position.

The activators 48 and 49 are now uncoupled from the elevator attachment 70 and the extension arm 64 is removed. Thereafter, the activators 48 and 49 are again, but now directly, connected to attachment 70 on the elevator 16, so that further rotation of the elevator 16 about pivot pin 28 can be accomplished whereby the vertical position, shown in FIG. 7, is obtained.

By maintaining the proper hydraulic pressure to the activators 48 and 49, the elevator can be positioned in such a way that the complete weight does not rest on the pivot hinge means 26 and an equilibrium is obtained whereby the hinge pin 28 easily can be removed. Of course, it should be realized that a hinge pin 28 having a loose fitting arrangement in the pivot hinge means 26 is therefore preferred.

During the raising and vertical positioning of the elevator 16, the silo 14 has taken a temporary task for serving as a crane structure and as can be realized, the maximum weight and loads developed during those procedures have been handled via the directly vertically positioned twin support members 44. Accordingly, the twin support members 44 are one of the unique components utilized in the erection procedure as well as the hinge plate mounting brackets 18.

The hinge plate mounting brackets 18 have accomplished their task as soon as the pivot hinge pin 28 was removed, since during the preceding erection steps, the silo connection to the trailer has formed a solid mounting pad of trailer bed structure and silo structure in a united arrangement.

Since the erection of the silo and the elevator has been accomplished, the detachment of the brackets 18 from the trailer structure by unwelding or demounting can be performed.

As soon as the bracket 18 first hinge plates 22 are loosened from the silo legs 42, the hinge plates 22 can be folded away about the hinge bolt 20. The folding away position has been illustrated in FIG. 3 wherein the first hinge plates 22 are shown in a phantom line fashion and as can be observed, the trailer dual wheels are clearing the silo legs 42, when the trailer is removed.

By slightly raising the elevator 16, the trailer bed can be driven away and the elevator 16 will be clear from the trailer bed upper surface. The elevator 16 may then be lowered to the ground.

The most essential components for the preferred embodiment have been illustrated and have been provided with reference characters. However, additional components, not mentioned in the specification are illustrated for completion of the various components and have not been mentioned in the specification since they are deemed to be understandable features to persons skilled in the art.

As has been mentioned above, the present invention relates to a method and to a variety of components for erecting a portable silo and elevator structure as a remote location, for utilization as an asphalt production plant or the like.

Figure 9:
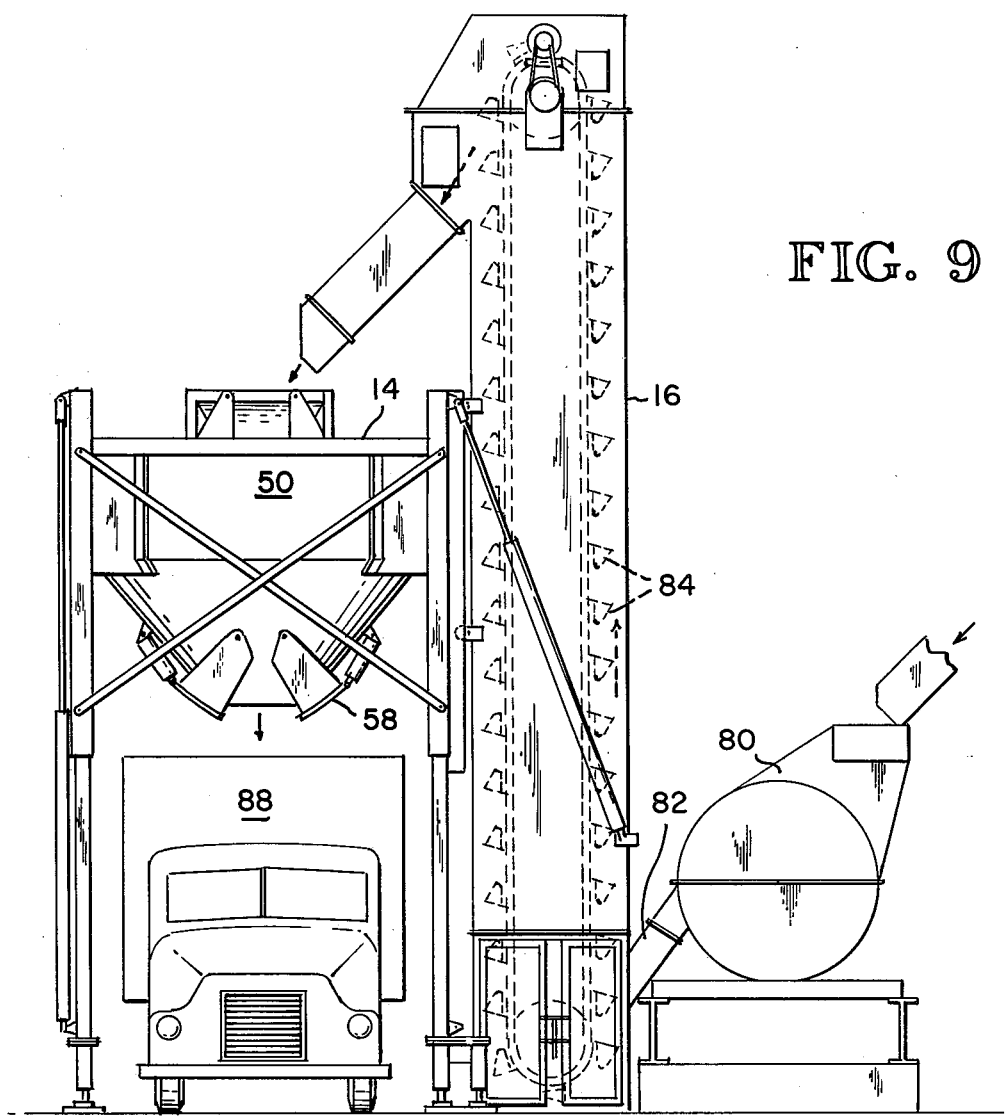
FIG. 9 is a side view of the silo and elevator and a thereon connected associated asphalt drum mixer plant portraying the portable asphalt plant in full operation.

In FIG. 9, the portable silo and elevator structure in its final stage of installation and operation have been illustrated. As explained here before the silo and elevator unit was to be utilized in connection to the drum mixer process. Accordingly, a drum mixer 80 where gravel, sand and asphalt is mixed and heated in a drum simultaneously, is attached next to the elevator unit and its output tube 82 is shown to fill the buckets 84 of the elevator unit for the position into the silo funnel 50 and for later transportation via the clamshell doors 56 by the truck 88 to the desired destination.

The invention, the scope of it is defined in the appended claims, is not limited in its application to the details of construction and arrangements of parts shown and described, since the invention is capable of other embodiments and of being practiced or carried out in various other ways. Also it is to be understood that the phraseology or terminology employed herein is for the purpose of description and not limitation.

Now, therefore, I claim;

1. A portable self-erecting folded up silo and elevator structure carried on a trailer, comprising in combination:
   (a) A trailer bed carrying a silo with telescoping legs, said telescoping legs extending downwards adjacent said trailer bed;
   (b) hinge plate mounting bracket means, comprising a first hinge plate and a second hinge plate, hingeably connected by a hinge bolt, operatively connected by said first hinge plate to each of said telescoping legs and mounted by said second hinge plate to said trailer bed, for securing said silo structure to said trailer bed for portable and self-erecting purposes;

(c) an elongated elevator structure disposed on said trailer bed and secured thereon by one pivot hinge means at said elevator bottom side adjacent said silo structure and for pivoting said elevator in upright position next to and adjacent with said silo structure when said silo structure is erected by telescoping said silo legs in expanded condition;

(d) actuator means mounted on said silo structure for raising said silo structure through expansion of said telescoping legs and said actuator means provided with remounting attachment means on one end for connection from said silo to said elevator for raising said elevator about said pivot hinge means, and (e) support means for mounting and supporting said silo telescoping legs extending downwards adjacent said trailer bed onto ground surface.

2. A portable, self-erecting, folded up silo and elevator structure carried on a trailer, as claimed in claim 1 wherein said actuator means are provided with extension arm means for raising said elevator thereby providing a larger leverage between said erected silo and said to be raised elevator.

3. A portable, self-erecting, folded up silo and elevator structure carried on a trailer, as claimed in claim 2 wherein said elevator unit is secured by upright securing and restraining means mounted to said trailer bed at a predetermined location from said pivot hinge means.

4. A portable, self-erecting, folded up silo and elevator structure carried on a trailer, as claimed in claim 3 wherein said restraining means is provided with a holding means at its upper portion for holding said raised elevator at a first stage erection thereof and whereby continued raising is provided by removal of said extension arm and reconnection of said actuator means to said elevator attachments.

* * * * *